(12) United States Patent
Thiele et al.

(10) Patent No.: US 6,537,620 B1
(45) Date of Patent: Mar. 25, 2003

(54) METHOD FOR THE PRODUCTION OF WEATHER-RESISTANT POWDER COATINGS ON A SUBSTRATE

(75) Inventors: Olaf Thiele, Baar Ebenhausen (DE); Frank Zimmermann, Frontenhausen (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/048,578

(22) PCT Filed: Jul. 21, 2000

(86) PCT No.: PCT/EP00/06996

§ 371 (c)(1), (2), (4) Date: May 9, 2002

(87) PCT Pub. No.: WO01/09258

PCT Pub. Date: Feb. 8, 2001

(30) Foreign Application Priority Data

Jul. 30, 1999 (DE) .......................................... 199 35 539

(51) Int. Cl.⁷ .................................................. C08F 2/46

(52) U.S. Cl. ........................ 427/521; 427/195; 427/508; 427/557; 427/559; 427/595

(58) Field of Search ................................ 427/521, 195, 427/508, 557, 559, 595

(56) References Cited

U.S. PATENT DOCUMENTS 5,486,988 A    1/1996    Tyson

FOREIGN PATENT DOCUMENTS

| EP | 0600546 A | 6/1997 |
| JP | 59016571 A | 1/1984 |
| WO | 05611021 B1 | 9/1993 |
| WO | WO9941323 A | 8/1999 |

*Primary Examiner*—Bernard Pianalto

(57) ABSTRACT

A process for preparing weather-resistant powder coatings on metallic or non-metallic surfaces by applying a powder coating composition and then melting and curing, wherein a powder coating composition is applied which contains polyester resins in which the acid structural blocks are based only or mainly on aromatic dicarboxylic acids, their anhydrides and/or esters, and polyfunctional low molecular weight epoxides as cross-linking agents, and the melting and curing is performed by NIR radiation.

8 Claims, No Drawings

METHOD FOR THE PRODUCTION OF WEATHER-RESISTANT POWDER COATINGS ON A SUBSTRATE

BACKGROUND OF THE INVENTION

The invention provides a process for preparing exterior weather-resistant powder coatings on metallic and non-metallic substrates.

The decorative or functional coating of surfaces with powder coatings has found a wide range of applications when coating metals due to the high economic viability of the process and the favourable assessment from the point of view of protecting the environment. Numerous powder coating formulations have been developed for different areas of use. For coatings which are subject to UV irradiation, for example those exposed to outdoor conditions (architectural paint, window profiles, garage doors, metal doors, garden furniture, car parts, etc.), stable powder coating systems, for example based on polyester resins with terminal carboxyl groups, have been developed. The polyester resins are generally cured with low molecular weight, high-functional cross-linking agents such as polyfunctional epoxides or hydroxyalkylamides.

Exterior weather-resistant powder coatings based on polyesters which are based on aromatic carboxylic acids such as terephthalic acid or isophthalic acid have been known and used for some time. Powder coatings which are based on these polyester resins are cost-effective to prepare and the coatings have good mechanical properties and a resistance to weathering which is adequate for many applications, in particular in regions with moderate climatic conditions. These types of powder coating systems are cured on the substrate using known, conventional, methods.

There has been no lack of attempts to increase the weather-resistance of powder coating systems. For example, attempts have been made to improve the weather-resistance of powder coatings by the use of polyester resins which are built up exclusively or mainly from aliphatic and/or cycloaliphatic components. These polyester resins are described, for example, in U.S. Pat. No. 5,486,988 and in EP 0 561 102. Although powder coatings prepared from these resins show improved weather-resistance, they have substantially poorer mechanical properties and much higher raw materials costs than the systems based on aromatic carboxylic acids mentioned above.

Therefore, there is the object of providing cost-effective powder coating coatings which do not have the disadvantages described above. In particular, the powder coatings should satisfy demands for increased weather-resistance so that they can also be used, for example, in regions with extreme climatic conditions without deterioration of the coatings.

SUMMARY OF THE INVENTION

This object can be achieved by a process in which powder coating coatings based on polyester resins which contain aromatic dicarboxylic acids, their anhydrides and/or esters as essential constituents, and which are cross-linked with low molecular weight, polyfunctional epoxide resins, are cured by the use of radiation in the near infra-red region (NIR).

DETAILED DESCRIPTION OF THE INVENTION

The powder coating compositions may contain, for example, 40 to 95 wt. % of polyester and 1 to 20 wt. % of the low molecular weight, polyfunctional epoxide resins, wherein other conventional constituents may also be present in conventional amounts, so that the amounts of all the constituents add up to 100 wt. %.

The polyesters have a number average molecular weight Mn of, for example, 500 to 10000 and a glass transition temperature of, for example, 30 to 80° C.

The polyesters may contain hydroxyl and/or carboxyl functions, wherein if this type of functionalisation is present the OH value may be, for example, 10 to 200 and the acid value may be, for example, 10 to 200.

The NIR radiation used according to the invention is short-wave infra-red radiation with an intensity maximum in the wavelength range from about 760 to about 1500 nanometres, preferably 780 to 1200 nanometres. The use of NIR radiation to dry lacquers is generally known (Kai Bär, JOT 2/98). According to this method, powder coatings may be cured in a short time with the aid of NIR radiation of high intensity without any substantial warming of the substrate taking place.

Surprisingly, it was found that powder coatings based on polyester resins which contain aromatic dicarboxylic acids such as terephthalic acid or isophthalic acid, their anhydrides and/or esters as essential structural blocks, together with low molecular weight, polyfunctional epoxides as cross-linking agents, when cured with NIR radiation, have a weather-resistance which is much greater than the resistance usually produced with such resin systems which have been cured in a conventional process, for example in a circulating air oven. The mechanical properties such as e.g. the flexibility of the coating, are of at least the same quality as are produced by conventional curing. In addition, NIR curing enables a substantial shortening of the curing time as compared with conventional oven curing.

Powder coating formulations which can be used in the process according to the invention have, as the basis of the binder, hydroxyl and or carboxyl-functional polyesters which contain, as the only or main constituent of the acid structural blocks, aromatic dicarboxylic acids, their anhydrides and/or esters such as, for example, terephthalic acid or isophthalic acid, which are reacted with conventional aliphatic diols such as, for example, neopentyl glycol, ethylene glycol, butylene glycol, hexanediol or diethylene glycol or cyclohexanedimethanol. Examples of other aromatic dicarboxylic acids are naphthaline-2-6-dicarboxylic acid, naphthaline-1,5-dicarboxylic acid and phthalic acid. Carboxyl-functional polyesters based on terephthalic acid and isophthalic acid or their anhydrides are preferably used.

An acid constituent with more than 50% of aromatic dicarboxylic acids, with respect to the dicarboxylic acid fraction in the polyester is preferred, particularly preferably an acid constituent with more than 50 wt. % of terephthalic acid and/or isophthalic acid or their anhydrides and/or esters.

Aliphatic and/or cycloaliphatic dicarboxylic acids such as, for example, adipic acid or cyclohexanedicarboxylic acid are optionally used as minor constituents, wherein the proportion of aliphatic and/or cycloaliphatic dicarboxylic acids is not more than 50%, with respect to the dicarboxylic acid fraction in the polyester. As other components, the polyester resins may contain small amounts of polyfunctional branching agents such as, for example, glycerol or trimethylolpropane and additives such as, for example, accelerators. It is also possible to use mixtures of different polyesters. Polyesters which may be used according to the invention may be prepared conventionally by reacting the dicarboxylic acids, their anhydrides and/or esters with the diols; see, for example, D. A. Bates, "The Science of Powder Coatings", vol. 1 and 2, Gardiner House, London, 1990.

Powder coating formulations which are suitable for use in the process according to the invention contain the amount of low molecular weight, polyfunctional epoxides, as a cross-linking component, required for curing. The amount is generally 1 to 20 wt. %, with respect to the polyester/epoxide system. Triglycidyl isocyanurate (TGIC), polyglycidyl esters based on terephthalic acid/trimellitic acid (obtainable e.g. from Ciba Spezialitäten Chemie under the tradename Araldite® PT 910), polyfunctional aliphatic oxirane compounds such as are provided, for example, by the company DSM Resins under the tradename Uranox®, or glycidyl-functionalised (meth)acrylate copolymers, for example, can be used as cross-linking agents.

The powder coating formulations, containing polyester and epoxide cross-linking agent, may optionally contain other conventional constituents such as, for example, pigments and/or fillers and optionally other conventional additives such as flow control agents, degassing agents and/or accelerators. These are added in amounts which are familiar to a person skilled in the art. For example, 0 to 50 wt. % of pigments and/or fillers and 0.02 to 3 wt. % of conventional additives are used.

Powder coats according to the invention are prepared by known extrusion/milling methods which are familiar to a person skilled in the art. Other processes may also be used, for example the preparation of powders by spraying super-critical solutions or the non-aqueous dispersion process.

In the process according to the invention, the powder coats described above are applied to the substrates to be coated by known powder application processes, for example by an electrostatic spray process, and are then melted and cured by irradiation with NIR radiation which has, for example, a maximum in intensity distribution in the region 800 to 1200 nm, within a period of, for example, 1 to 200 seconds, preferably 1 to 30 seconds. Radiation elements suitable for the coating process according to the invention are commercially available, for example, from the Industrie SerVis Co.; for example, halogen lamps which reach a radiation element temperature of 3500 K may be used. A combination with conventional sources of heat (infra-red radiation, convection ovens) and optionally with additional reflector/lens systems may also be used.

Curing is preferably performed using NIR radiation without additional combinations.

Coatings obtained by the process according to the invention have exceptional flow characteristics, good mechanical properties and a greatly improved weather-resistance as compared with conventionally cured powder coating coatings based on the same resins.

The required degree of gloss of the powder coating can be adjusted by varying the powder coating formulation. It is possible to produce either high-gloss or else silk-finish or matt coatings.

Powder coatings obtained by the process according to the invention may be used for all applications where weather-resistance is required. Metals such as aluminium, steel or else wood-based materials such as e.g. medium density fibreboard (MDF) or mixtures of different materials may be used as substrates. Due to the good mechanical properties, in particular the flexibility of the coatings obtained, the process is also particularly suitable for coating coil or pre-coated metals (PCMs).

The process according to the invention enables the economically viable preparation of exterior weather-resistant powder coatings with exceptional properties by using cost-effective raw materials and a clear reduction in the curing time.

The following examples explain the invention:
Preparing the Powder Coatings

The powder coating formulations listed in the table were converted into coating powders by the process conventionally used for powder coating preparation, by intensive mixing of the components, extruding and milling. The powders were applied electrostatically with the same layer thickness to test sheets of aluminium, with the aid of a Corona powder spray-gun. Curing, using the process according to the invention, took place in a strip unit which was provided with a 500 W NIR radiation element from the Industrie SerVis Co., at a power per unit area of 120 kW/m². The curing times were 5 seconds for example 1, 12.5 seconds for example 2, 15 seconds for example 3 and 8 seconds for example 4. Curing was performed with a distance of 50 mm between the radiation element and the substrate. In the case of the comparison examples, the samples were cured for 10 minutes at 200° C. in a circulating air oven.

TABLE 1

Powder coating compositions

| Example no. | 1 | 2 | 3 | 4 |
| --- | --- | --- | --- | --- |
| Colour | black | red | white | grey |
| Resin Alftalat AN 03640 | 57% | 57 % | 57 % | 57 % |
| Hardener Araldite PT 910 | 5.2% | 5.2% | 5.2% | 5.2% |
| Pigmentation | 1% carbon black | 2% organic red pigment | 25% titanium dioxide | 19.8 % inorganic pigments |
| Filler | 32.3% | 31.3% | 8.3% | 13.5% |

*A polyester in which the acid component contains terephthalic acid and isophthalic acid as the main constituents.

All the formulations contain 4.2% of a commercially available flow control agent and 0.3% of a degassing auxiliary substance.

Weathering Trial

Testing the mechanical properties before and after the weathering test resulted in the following values for all the samples:

Falling ball impact test (ASTM D 2794) 20 inch pounds
Mandrel flex test (DIN EN ISO 1519) 4 mm
Erichsen test (DIN EN ISO 1520) 7 mm
Cross-hatching (DIN EN ISO 2094) GtOA All the samples were tested in rapid weathering rest QUV (B) 313 nm. Table 2 gives the times after which the residual gloss (measured at 60°) had fallen to 50% of the starting value before weathering.

TABLE 2

Results of tests after weathering

| Sample from example no. | 1 | 1* | 2 | 2* | 3 | 3* | 4 | 4* |
| --- | --- | --- | --- | --- | --- | --- | --- | --- |
| Residual gloss <50% after (h) | 450 | 350 | 500 | 400 | 500 | 400 | 500 | 350 |

*Samples not according to the invention, these being cured in a circulating air oven.

What is claimed is:
1. A process for preparing weather-resistant powder coatings applied to a surface selected from the group consisting of metallic and nonmetallic surfaces, which comprises the steps of applying a powder coating composition to the surface, and then melting and curing the applied powder coating composition, wherein the powder coating composition comprises a polyester resin comprising an acid structural block selected from the group consisting of aromatic dicarboxylic acids, aromatic dicarboxylic acid anhydrides, and aromatic dicarboxylic acid esters, and a polyfunctional low molecular weight epoxide crosslinking agent, wherein the melting and curing is performed by NIR radiation.

2. A process according to claim 1, wherein the polyester resin comprises 50 wt. % of acid structural blocks selected from the group consisting of aromatic dicarboxylic acids, aromatic dicarboxylic acid anhydrides, and aromatic dicarboxylic acid esters.

3. A process according to claim 1, wherein the powder coating composition comprises 40 to 95 wt. % of the polyester resin.

4. A process according to claim 3, wherein the polyester resin is carboxyl-functional.

5. A process according to claim 4, wherein the polyester resin is comprised of acid structural blocks selected from the group consisting of terephthalic acid, isophthalic acid, terephthalic acid anhydride, isophthalic acid anhydride, terephthalic acid ester, and isophthalic acid ester.

6. A process according to claim 5, wherein the polyester resin comprises 50 wt. % of acid structural blocks selected from the group consisting of terephthalic acid, isophthalic acid, terephthalic acid anhydride, isophthalic acid anhydride, terephthalic acid ester, and isophthalic acid ester.

7. A process according to claim 1, wherein the curing times are in a range from 1 to 30 seconds.

8. A process according to claim 1, wherein an NIR radiation element comprising a maximum intensity distribution of 0.8 to 01.2 $\mu$m is used.

* * * * *